United States Patent [19]

Wilson

[11] Patent Number: 5,203,702
[45] Date of Patent: Apr. 20, 1993

[54] WRITING BOARD KIT HAVING LIGHT-SENSITIVE SELF-ILLUMINATING DRAWING SURFACE

[76] Inventor: Robert T. Wilson, 1514 Carlisle Ct., Oklahoma City, Okla. 73120

[21] Appl. No.: 881,162
[22] Filed: May 11, 1992
[51] Int. Cl.[5] .................................. G09B 11/00
[52] U.S. Cl. .................................. 434/85; 434/87; 434/408
[58] Field of Search .................. 434/85, 87, 408, 365

[56] References Cited

U.S. PATENT DOCUMENTS

| | | | |
|---|---|---|---|
| 3,443,332 | 5/1969 | Christy | 434/408 X |
| 4,590,381 | 5/1986 | Mendelson | 434/408 X |
| 4,836,783 | 6/1989 | Harper | 434/87 |

Primary Examiner—John J. Wilson
Assistant Examiner—Jeffrey A. Smith
Attorney, Agent, or Firm—Leon Gilden

[57] ABSTRACT

A kit is arranged to provide a housing having a light-sensitive self-illuminating web receiving templates thereon, wherein a flashlight member is directed onto the templates, and more specifically to the template openings to provide for patterns to be illuminated by the self-illuminating web when the templates are removed. The kit structure is arranged to include a plurality of such templates stored within a housing cavity, and may optionally be provided with a lid arranged to secure the templates within the housing cavity, as well as a template mounted upon the web during use.

1 Claim, 4 Drawing Sheets

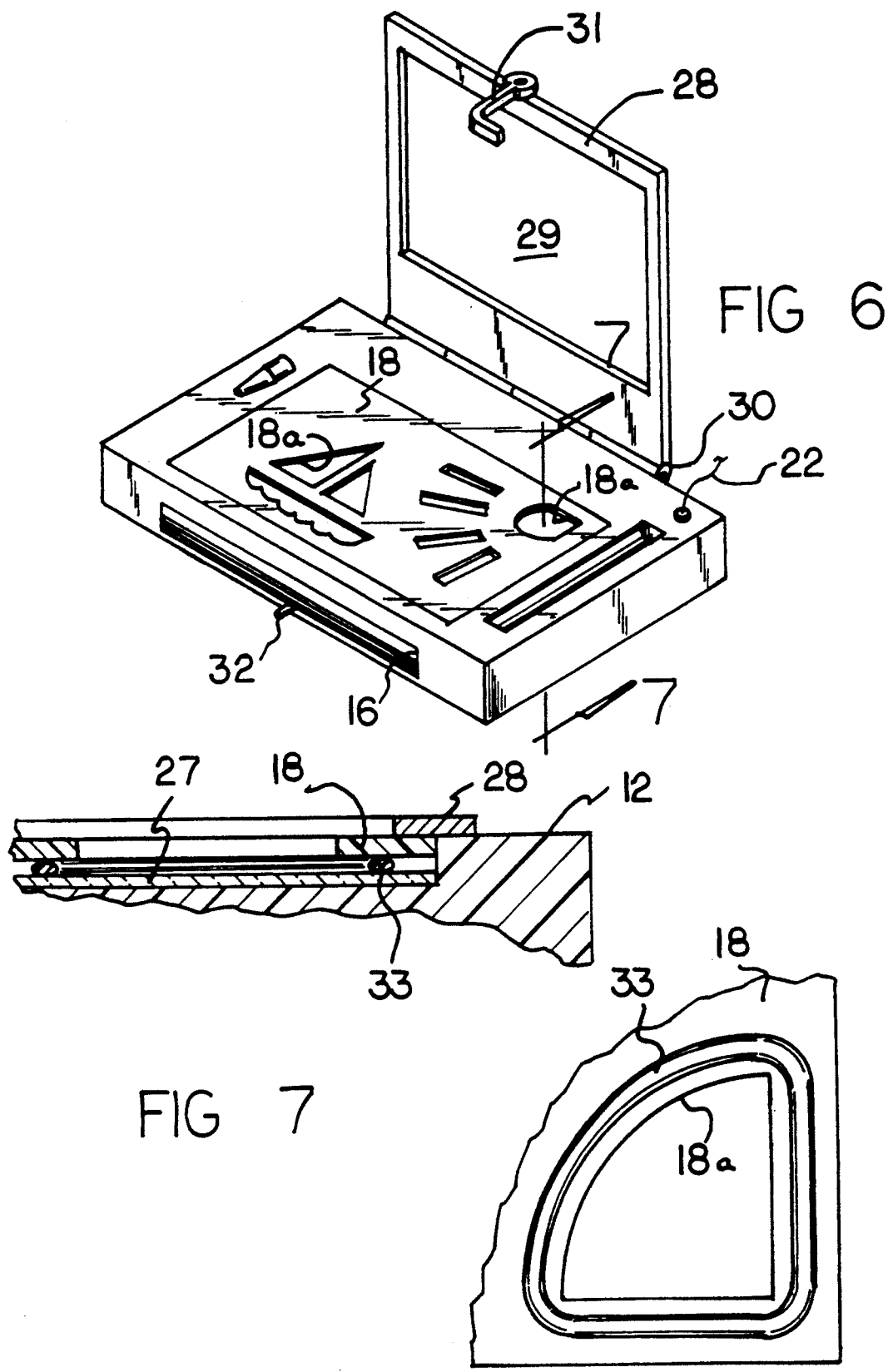

WRITING BOARD KIT HAVING LIGHT-SENSITIVE SELF-ILLUMINATING DRAWING SURFACE

BACKGROUND OF THE INVENTION

1. Field of the Invention

The field of invention relates to writing board structure, and more particularly pertains to a new and improved writing board kit wherein the same is arranged to provide for luminescent replication of various configurations imparted to a self-illuminating web.

2. Description of the Prior Art

Writing board kits of various types are available in the prior art for amusement and entertainment of individuals, as well as for educational purposes thereof. Such kit structure is exemplified in the U.S. Pat. No. 4,960,382 to Alford having a wax surface writing pad structure to include hook and loop fastening means relative to a translucent sheet for securement of the sheet relative to the organization.

Various drawing boards and the like are exemplified in the U.S. Pat. Nos. 4,934,061; 4,833,279; and 4,953,859.

As such, it may be appreciated there continues to be a need for a new and improved writing board kit as set forth by the instant invention which addresses both the problems of ease of use as well as effectiveness in construction in providing for the entertainment and amusement of individuals by having a self-illuminating web arranged to receive a pattern directed by a flashlight through a template and in this respect, the present invention substantially fulfills this need.

SUMMARY OF THE INVENTION

In view of the foregoing disadvantages inherent in the known types of writing board apparatus now present in the prior art, the present invention provides a writing board kit wherein the same is arranged to accommodate various templates upon a self-illuminating web to effect replication of openings within the templates onto the web. As such, the general purpose of the present invention, which will be described subsequently in greater detail, is to provide a new and improved writing board kit which has all the advantages of the prior art writing board apparatus and none of the disadvantages.

To attain this, the present invention provides a kit arranged to provide a housing having a light-sensitive self-illuminating web receiving templates thereon, wherein a flashlight member is directed onto the templates, and more specifically to the template openings to provide for patterns to be illuminated by the self-illuminating web when the templates are removed. The kit structure is arranged to include a plurality of such templates stored within a housing cavity, and may optionally be provided with a lid arranged to secure the templates within the housing cavity, as well as a template mounted upon the web during use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved writing board kit which has all the advantages of the prior art writing board apparatus and none of the disadvantages.

It is another object of the present invention to provide a new and improved writing board kit which may be easily and efficiently manufactured and marketed.

It is a further object of the present invention to provide a new and improved writing board kit which is of a durable and reliable construction.

An even further object of the present invention is to provide a new and improved writing board kit which is susceptible of a low cost of manufacture with regard to both materials and labor, and which accordingly is then susceptible of low prices of sale to the consuming public, thereby making such writing board kits economically available to the buying public.

Still yet another object of the present invention is to provide a new and improved writing board kit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of the invention utilizing a lid in cooperation with the templates.

FIG. 7 is an orthographic view, taken along the lines 7—7 of FIG. 6 in the direction indicated by the arrows.

FIG. 8 is an orthographic bottom view of a template plate opening relative to the template plate illustrating a surrounding seal.

DESCRIPTION OF THE PREFERRED EMBODIMENT

Figure 1:
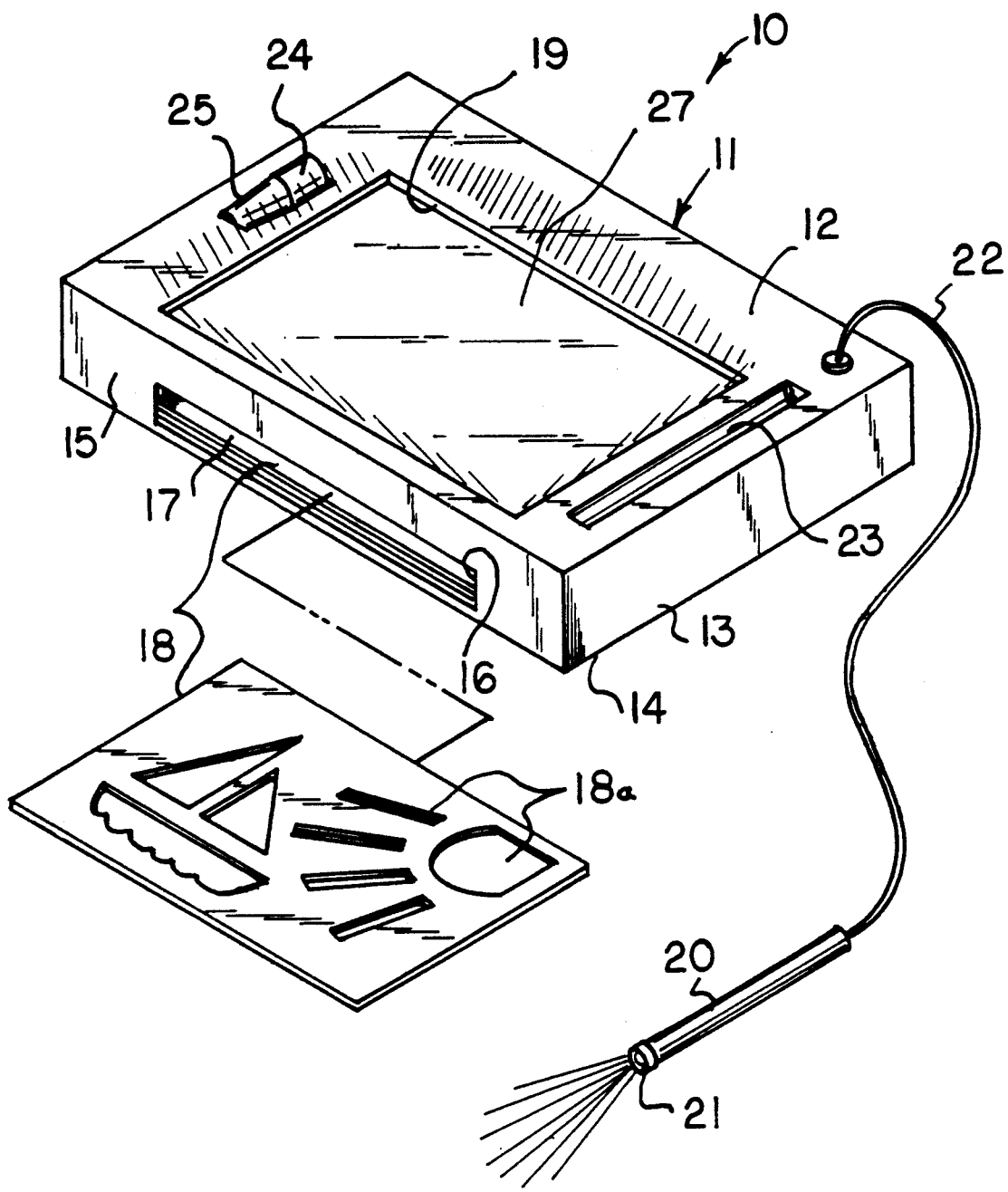
FIG. 1 is an isometric illustration of the instant invention.
Figure 2:
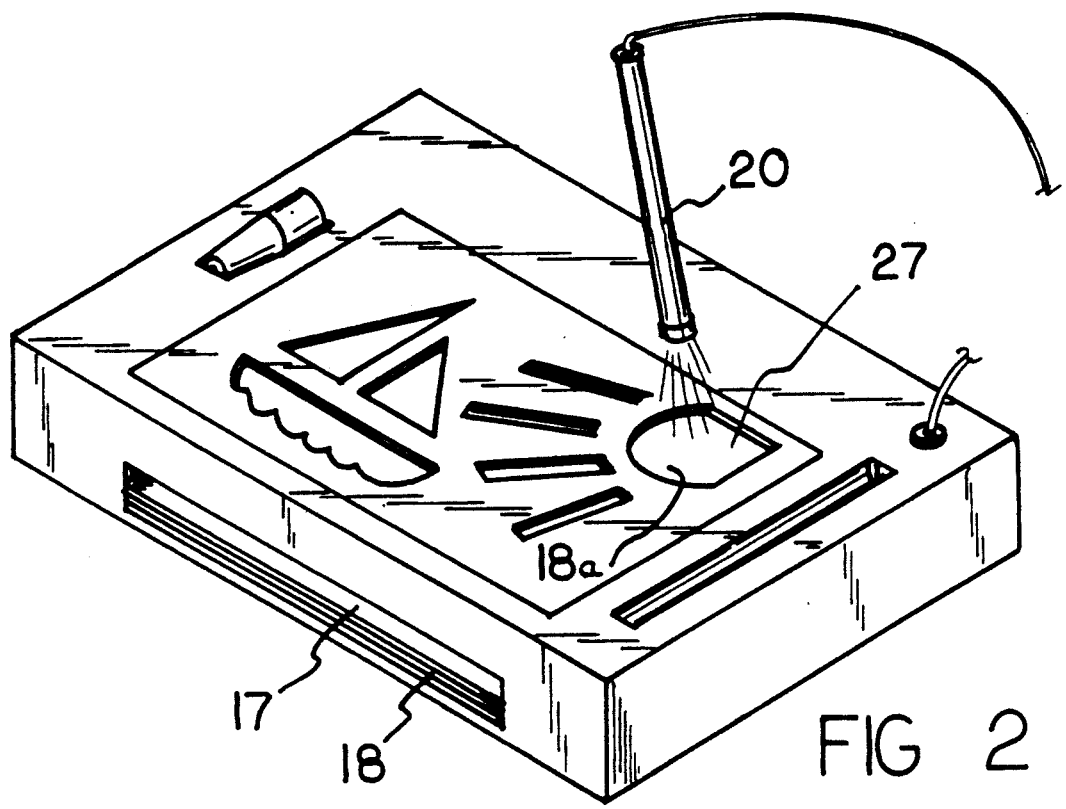
FIG. 2 is an isometric illustration of the invention in use.
Figure 3:
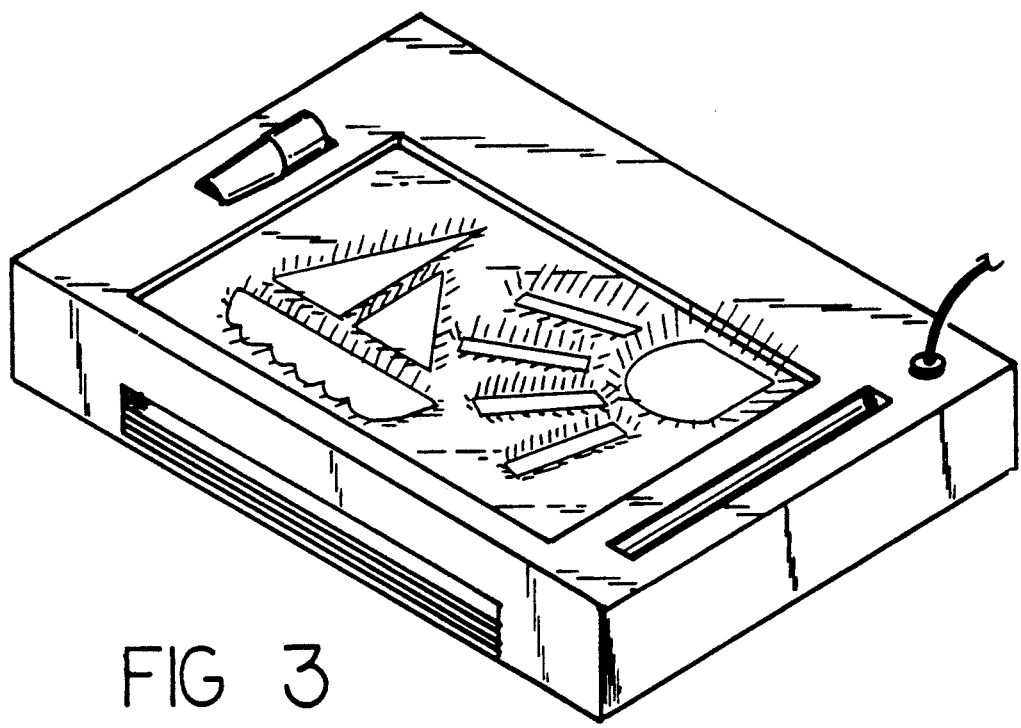
FIG. 3 is an isometric illustration of the invention having the template removed and the replicated patterns imparted to the self-illuminating web.

With reference now to the drawings, and in particular to FIGS. 1 to 8 thereof, a new and improved writing board kit embodying the principles and concepts of the present invention and generally designated by the reference numeral 10 will be described.

Figure 4:
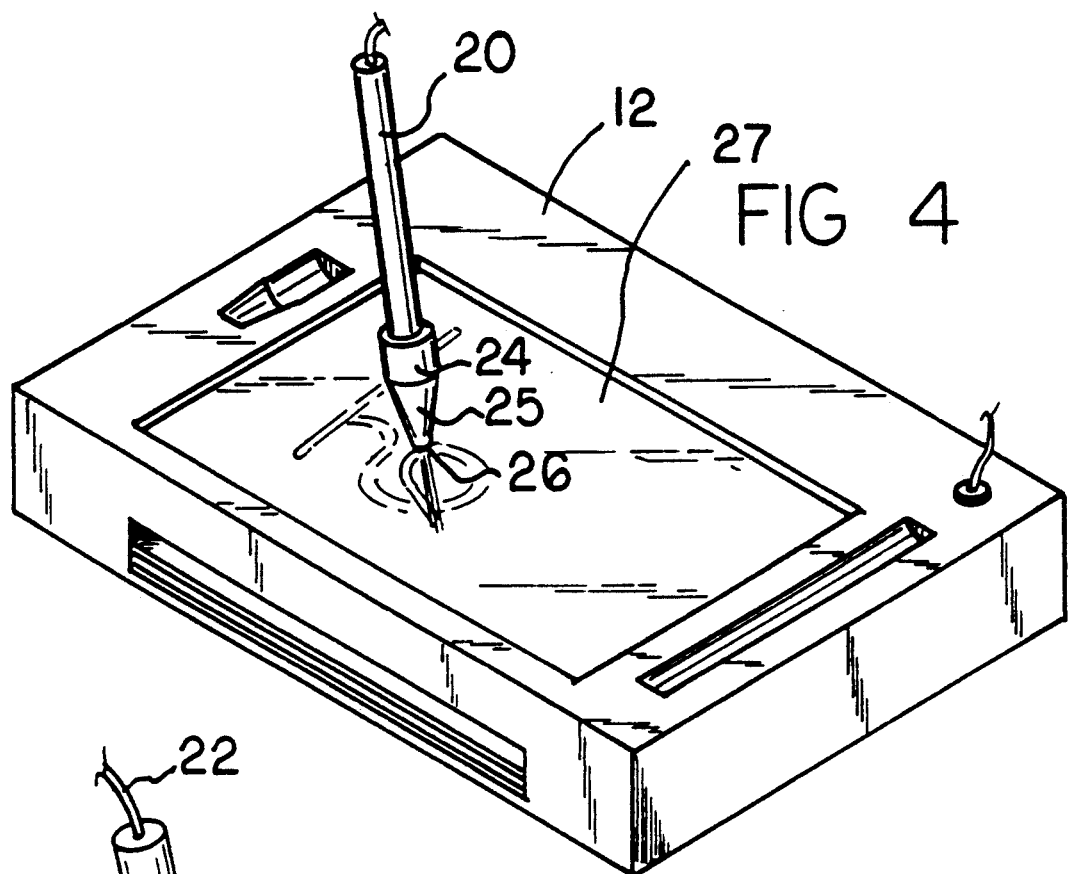
FIG. 4 is an isometric illustration of the invention utilizing an alignment adapter to permit imparting hand writing upon the self-illuminating web.
Figure 5:
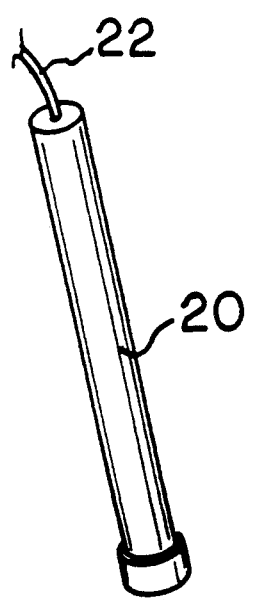
FIG. 5 is an isometric enlarged illustration in an exploded view of the adapter mounted relative to the flashlight structure.

More specifically, the writing board kit 10 of the instant invention essentially comprises a support container 11 having a top wall 12, a plurality of spaced end walls 13, a bottom wall 14, and at least a forward side wall 15 having a forward side wall opening 16. The forward side wall opening 16 directs entrance into a housing storage cavity 17, with the container positioned in a parallel relationship below the top wall 12 and includes a plurality of template plates 18 each of a predetermined configuration, and each including a plurality of variously configured template plate openings relative to various predetermined geometric designs, lettering, and the like as desired for educational and entertainment purposes. The top wall 12 includes a top wall opening 19 of said predetermined configuration to complementarily receive one of the template plates 18 therewithin. Positioned below the top wall opening 19 is a light-sensitive self-illuminating web 27 arranged to effect luminescent properties when light is directed thereon. To this end, a flashlight tube 20 of a predetermined first diameter has an illuminated forward end 21, with the flashlight tube 20 having a tether line 22 secured to its rear distal end, with the tether line 22 mounted to the container. A top wall recess 23 is arranged to complementarily receive the flashlight tube 20 therewithin. A light alignment tube 24, including an entrance opening of said predetermined first diameter, is arranged to complementarily receive the illuminated forward end 21 therewithin, wherein a conical forward end 25 has a forward end opening 26 coaxially aligned relative to the flashlight tube 20 and includes a second diameter less than the first diameter to permit imparting of light in the form of lettering and the like to permit writing, such as illustrated in FIG. 4, in a freestyle manner as illustrated.

The FIG. 6 illustrates the support container 11 formed with a lid plate 28 having lid plate opening 29, with a rear edge of the lid plate 28 having a hinge 30 mounted to the support container to permit pivotment of the lid plate 28, and more specifically, the lid plate opening 29 over the self-illuminating web 27. A lid plate latch 31 mounted to a forward edge of the lid plate 28 is cooperative with a forward side wall latch 32 mounted to the forward side wall 15 below the forward side wall opening 16 to simultaneously secure the template 18 onto the self-illuminating web 27 and to secure remaining templates 18 within the housing storage cavity 17.

As illustrated in the FIGS. 7 and 8, each template plate 18 including a plurality of template plate openings 18a has each of the template openings 18a including a compressible resilient seal 33 arranged in surrounding relationship relative to each template plate opening 18a to a bottom surface of the template plate 18. In this manner, the self-illuminating web 27 is positioned below the housing top wall 12 a predetermined height, wherein a combined height of the uncompressed resilient seal 33 and the template plate 18 defines a further height greater than the predetermined height. Upon the lid plate 28 being secured to the container by latching of the lid plate latch 31 to the forward side wall latch 32, each seal 33 of a type as illustrated in the FIGS. 7 and 8 is thereby compressed to a second position from a first uncompressed position to insure light directed by the flashlight tube 20 is wholly contained within the confines of each seal 33 relative to a respective opening 18a to prevent irregular patterns imparted by the illuminated forward end 21 of the flashlight tube onto the self-illuminating web 27.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed and desired to be protected by Letters Patent of the United States is as follows:

1. A writing board kit, comprising, a support container, the support container including a top wall, a bottom wall spaced from the top wall, a plurality of spaced end walls, and a forward side wall, the foward side wall including a forward side wall opening, and the support container having a housing storage cavity positioned below the top wall, with the forward side wall opening directed into the storage container in communication therewith, and a plurality of template plates, each template plate of a predetermined peripheral configuration and each of said template plates having a plurality of template plate openings directed therethrough, and the top wall including a top wall opening, the top wall opening defined by said predetermined configuration to complementarily receive one of said template plates therewithin, and the support container including a light-sensitive self-illuminating web mounted to the support container below the top wall opening a predetermined height, and including a flashlight tube, the flashlight tube having a predetermined first diameter, and including an illuminated forward end, and a tether line mounted to a rear distal end of the flashlight tube, the tether line secured to the support container, and the top wall including a top wall recess to complementarily receive the flashlight tube therewithin, and a light alignment tube having an entrance opening of said predetermined first diameter to complementarily receive the illuminated forward end of the flashlight tube therewithin, and the light alignment tube including a conical alignment tube forward end having a forward end opening of a second diameter less than the first diameter, with the forward end opening coaxially aligned with the light alignment tube to concentrate illumination from the flashlight tube illuminated forward end onto the light-sensitive self-illuminating web, and including a lid plate having a lid plate opening, the lid plate including a lid plate rear edge and a lid plate forward edge, the plate rear edge including a lid plate hinge, the lid plate hinge secured to the support container for pivotment of the lid plate relative to the support container, the lid plate forward edge including a lid plate latch, and the support container forward side wall including a forward side wall latch fixedly mounted to the forward side wall below the forward side wall opening, whereupon securement of the lid plate latch to the forward side wall latch effects securement of said plurality of template plates within the housing storage cavity and simultaneously secures one of said template plates within the support container below the top wall, and wherein each template of said plurality of template plates includes a template plate bottom surface and a template plate top surface, each template bottom surface includes at least one continuous compressible resilient seal arranged in surrounding relationship relative to at least one template plate opening, and the continuous compressible resilient seal and template plate define a further height greater than the predetermined height to extend above the top wall when one of said template plates is mounted within the top wall opening in a first position and upon securement of the lid plate forward side wall latch effects compression of the seal to a second position equal to the predetermined height to effect sealing engagement of said seal with the light-sensitive self-illuminating web.

* * * * *